Figure 1:
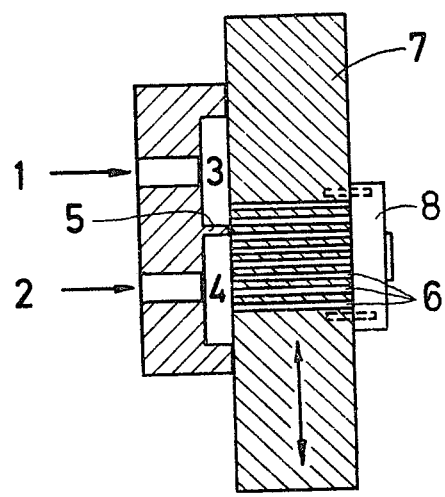

United States Patent [19]

Andersson

[11] 4,011,890
[45] Mar. 15, 1977

[54] GAS MIXING VALVE

[75] Inventor: Lennart Valentin Andersson, Alvsjo, Sweden

[73] Assignee: Sjumek, Sjukvardsmekanik HB, Alvsjo, Sweden

[22] Filed: Nov. 4, 1975

[21] Appl. No.: 628,757

[30] Foreign Application Priority Data

Nov. 25, 1974 Sweden .............................. 7414804

[52] U.S. Cl. ...................... 137/625.4; 137/625.41; 137/614.17; 137/614.2
[51] Int. Cl.² ......................................... F16K 11/00
[58] Field of Search ..... 137/625.4, 625.41, 625.44, 137/527, 527.2, 607, 614.16, 614.17, 614.2; 239/61, 414; 48/180 C, 180 R

[56] References Cited

UNITED STATES PATENTS

| 1,896,092 | 2/1933 | Mangiameli | 137/625.41 X |
| 3,363,650 | 1/1968 | Scaramucci | 137/614.17 |

Primary Examiner—Arnold Rosenthal

[57] ABSTRACT

Gas mixing valve having separate inlets for two gases, a common outlet and a dispensing device located between said inlets and the outlet, and a reflux preventing valve, said dispensing device consisting of an adjustable slide block with a number of functionally parallel-connected gas channels, one end of which is connectable to one or the other inlet and the other end of which is closable under spring action by means of a valve flap common to the gas channels and arranged to open to different extents for different flows but equally for all individual gas channels.

8 Claims, 5 Drawing Figures

GAS MIXING VALVE

The invention relates to a valve for mixing two gases. Gas mixing valves of this kind have two separate inlets for the two gases, a common outlet, and a dispensing and mixing device situated between the inlets and the outlet. The invention relates to a gas mixing valve of this kind, which at the same time exhibits a valve device preventing reflux.

The function of such gas mixing valves is quite generally to dispense the two gases, delivered at essentially the same pressure, in, within certain limits, optional proportions, and to mix them. At the same time, in the use of such valves, the penetration of one gas through the mixing valve into the inlet for the other gas must be definitely prevented in order to preclude the possibility, for example, of laughing gas flowing through the mixing valve to a central gas supply with the attendant risk of cyanosis in conjunction with the administration of oxygen.

A problem attaching to such gas mixing valves is to attain a constant mixing ratio at both small, normal and large withdrawals, i.e. flows, of the gas mixture. Most known gas mixing valves suffer from the drawback that the mixing ratio varies with the flow of gas mixture, often in a difficultly controllable and irregular manner.

The object of the present invention is to propose a gas mixing valve of the kind referred to, which ensures satisfactory continuity in the gas mixing ratio regardless of the flow rate.

This is achieved according to the invention chiefly through the fact that the dispensing device consists of an adjustable slide block or the like with a number of functionally parallel-connected gas channels, one end of which is connectable to the one or alternatively the other gas inlet and the other end of which is closable under spring action by means of a valve flap common to the gas channels and arranged to open to different extents for different flows, but always to an equal extent for the individual gas channels. The valve flap is preferentially arranged so as to be actuated in its closing direction by a spring and to be opened against the force of this spring at a given difference of pressure, dependent on the spring force, between the inlets and outlet of the gas mixing valve.

According to an especially advantageous embodiment the valve body is rockable around a bearing edge so as to be liftable an equal amount from the other end of each individual channel. The channels, or at least their ends facing the valve flap, may appropriately be arranged in a row with the bearing edge running parallel to the row.

To obtain a sufficient width of each inlet, they may appropriately debouch into two chambers separated by a narrow partition.

According to a suitable embodiment of the invention the slide block with the gas channels is linearly movable relative to the two inlets and chambers, and the ends of the gas channels facing the inlets lie on a preferably straight line. Alternatively the slide block with the gas channels may also be rotatable relative to the two inlets and chambers and in such case the chambers may appropriately follow an arc of a circle running coaxially with the revolving shaft of the slide. In the latter case the ends of the gas channels facing the inlets may also appropriately be arranged in an arc, and their other ends facing the valve body and outlet side in a straight line.

Figure 2:
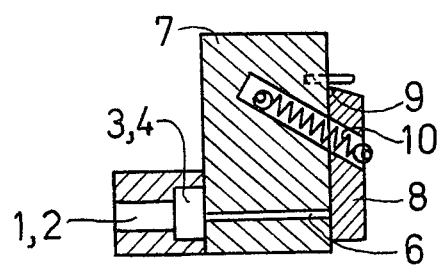
Figure 3:
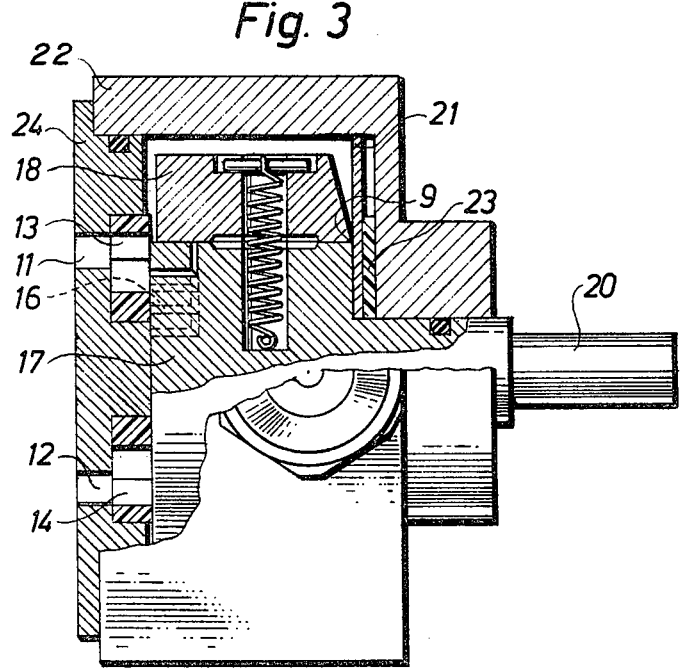
Figure 4:
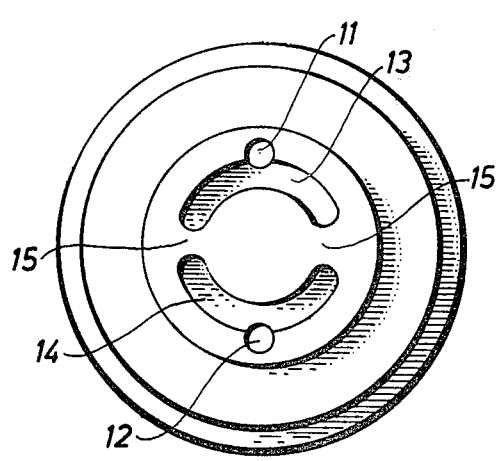
Figure 5:
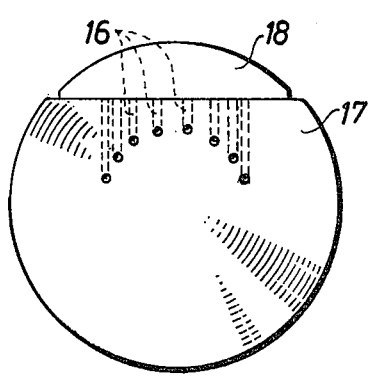

Other characteristics and details appear from the claims and from the following specification of two embodiments of the invention, which are illustrated schematically in the attached drawings, where FIG. 1 shows a first embodiment with straight slide block, viewed perpendicular to the direction of movement of the slide block, FIG. 2 the same embodiment viewed in the direction of movement of the slide block, FIG. 3 a second embodiment with rotatable slide block in an axial section along the revolving shaft, FIG. 4 an embodiment of the two gas inlets in the embodiment shown in FIG. 3, and FIG. 5 the end of the rotatable slide block remote from the revolving shaft in an axial view.

In the embodiment in FIGS. 1 and 2 with linearly movable slide block two different gases are introduced through two inlets 1 and 2 into their respective chambers 3 and 4. These chambers 3 and 4 are separated from one another by a narrow partition 5. A number of, in this case, parallel channels 6 of equal length are arranged in a slide block 7 or the like, which is movable along a straight line relative to the chambers 3 and 4. The right-hand ends of the gas channels 6 in FIGS. 1 and 2, the ends not connected to the chambers 3 and 4, lie in a row and are closed by means of a valve flap 8 common to all channel openings. This valve flap 8 is rockable around a bearing edge 9 against the force of a spring 10 visible only in FIG. 2. The bearing edge 9 runs parallel with the row formed by the ends of the gas channels facing the valve flap 8, i.e. the outlet side.

If the positive pressure in the gas channels 6 relative to the gas pressure on the side of the valve flap 8 remote from the gas channels exceeds a given minimum, which is dependent on the tension of the spring 10, the valve body 8 is raised simultaneously and equally from the whole row of gas channel openings below it. The facing sides of the valve slide block 7 and valve flap 8 are plane and have a highly smooth surface.

As will readily be realized, the mixing ratio between the two different gases is at all times determined by the number of gas channels that are connected to the inlet 1 and chamber 3, on the one hand, and to the inlet 2 and chamber 4 on the other. The greater the number of gas channels, the smaller the steps in which the mixing ratio can be varied.

If the valve flap 8 bears against the slide block 7, no gas from one of the inlets can flow through its chamber and gas channels 6 to the other chamber. If the valve flap 8 is raised from the slide block, the pressure in chambers 3 and 4 on the left of the slide block is greater than on the outlet side on the right of the slide block, for which reason no reflux to the other gas inlet owing to the fall in pressure between inlet and outlet is possible in this situation either.

In the embodiment in FIGS. 3–5 the slide block 17 is rotatable. Here, again, two different gases are introduced through two inlets 11 and 12 into their respective chambers 13 and 14. These are arc-shaped and coaxial with the revolving shaft 20. They are separated by two partitions 15. A number of gas channels 16 are arranged in the slide block and open into the inlets 11 and 12 in an arc of a circle, while those on the side of the rotary slide block 17 facing the valve flap 18 debouch along a straight line. The gas channels 16 may appropriately run, from their mouths arranged in the arc of a circle, first axially some way into the rotary slide block, thereafter continuing at right angles, and emerging on the rotary slide block 17 planed off along a chord. By giving the valve flap 18 an arc-shaped upper side, sufficient space is obtained for a spring, not visible in FIGS. 4-5, which also can be located as shown in FIG. 2, and the weight and amount of material can be reduced since the valve flap will have a lower height on the sides.

The pivoting or rocking of the valve flap 18 around an edge 9 is achieved through the fact that the valve flap bears against a disc 21 located on the shaft of the rotary slide block. Between this disc 21 and the valve housing 22 there is a packing washer 23, which may appropriately be of plastic with suitable antifriction properties. The design can be modified within the scope of the invention.

The inlets 11 and 12 and the chambers 13 and 14 are arranged in a disc-shaped component, represented in FIG. 3 in cross-section and in FIG. 4 in top view, fitted tight to the end of the mixing valve housing 22 by suitable means.

Here again, accordingly, all gas channels are closable under spring action by means of a common valve flap which, for increase of the bearing pressure, has been furnished with a groove-shaped cut-away portion parallel with the gas channel openings lying on a straight line. These channel ends open only on a given minimum pressure difference between the gas pressure in the channels and the gas pressure in the interior of the valve housing connected to the outlet. Owing to the rocking motion of the valve flap 18 on withdrawal of gas mixture the distance between the outlet ends of all gas channels, on the one hand, and the edge of the valve flap running parallel with the row of gas channels is always the same, whereby a constant mixing ration is attained even for widely varying flows, i.e. the opening angle of the valve flap varying with the flow.

The gas mixing valve according to the invention is also self-closing when the withdrawal of gas ceases. The opening of the valve takes place through the fact that, on withdrawal of gas, the pressure on the side of the valve flap facing the outlet falls, whereby the higher pressure in the gas channels raises the valve flap off the slide block and releases the ends of the gas channels thereunder against the force of the spring. When the withdrawal of gas ceases, the pressure on the outlet side falls again, so reducing the pressure difference between the inlet and outlet sides of the valve flap until the force of the spring gains the upper hand and again presses the valve flap against the outlet ends of the gas channels arranged in a straight line.

The invention is not limited to the two embodiments illustrated in the figures but can be arbitrarily modified within the scope of the following claims.

What is claimed is:

1. A gas mixing valve comprising a housing having two separate inlets and a common outlet, a gas dispensing device located between said inlets and said outlet and comprising an adjustable slide block formed with a plurality of substantially parallel gas channels, each having one end communicating with a selected one of said inlets and an opposite end at the outlet side, a valve flap common to said opposite ends of said channels and being normally biased against said opposite ends of said gas channels to prevent gas flow to said outlet.

2. The valve according to claim 1, wherein a spring is provided to urge said valve flap in closing direction in relation to said gas channels to close said opposite ends thereof, said valve flap moving from its channels closing position at a predetermined pressure difference between said inlets and said outlet.

3. The valve according to claim 2, wherein the valve flap is rockable about a bearing edge against the force of said spring for uniform movement from the opposite end of each individual channel.

4. The valve according to claim 3, wherein said opposite ends of the channels are in a row formation and wherein said bearing edge extends parallel to said row.

5. The valve according to claim 1, wherein said inlets communicate with chambers separated by narrow partition means.

6. The valve according to claim 1, wherein the slide block is rectilinearly movable relative to said inlets, said one of said ends of said gas channels lying on a straight line.

7. The valve according to claim 5, wherein the slide block with the gas channels formed therein is rotatable relative to said two inlets, said chambers being arc-shaped and coaxial with a revolving shaft for the slide block.

8. The valve according to claim 7, wherein said one of said ends of said gas channels lie on the arc of a circle, while said opposite ends lie on a straight line.

* * * * *